United States Patent
Komatsu et al.

(10) Patent No.: US 8,922,906 B2
(45) Date of Patent: Dec. 30, 2014

(54) ZOOM LENS AND IMAGING APPARATUS

(71) Applicant: FUJIFILM Corporation, Tokyo (JP)

(72) Inventors: Daiki Komatsu, Saitama-ken (JP); Michio Cho, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/217,847

(22) Filed: Mar. 18, 2014

(65) Prior Publication Data
US 2014/0198394 A1 Jul. 17, 2014

Related U.S. Application Data
(63) Continuation of application No. PCT/JP2012/005562, filed on Sep. 3, 2012.

(30) Foreign Application Priority Data

Sep. 16, 2011 (JP) .................. 2011-202595

(51) Int. Cl.
*G02B 15/14* (2006.01)

(52) U.S. Cl.
USPC ........... 359/686; 359/683; 359/684; 359/685; 359/688; 359/715; 359/740; 359/775

(58) Field of Classification Search
USPC .................. 359/683–686, 688, 715, 740, 775
See application file for complete search history.

(56) References Cited

U.S. PATENT DOCUMENTS

| | | | | |
|---|---|---|---|---|
| 4,110,006 A | * | 8/1978 | Ikemori | 359/684 |
| 4,124,274 A | * | 11/1978 | Tanaka et al. | 359/684 |
| 5,442,486 A | * | 8/1995 | Sato | 359/690 |
| 5,717,527 A | * | 2/1998 | Shibayama | 359/690 |
| 5,757,554 A | | 5/1998 | Fukami | |
| 5,920,435 A | * | 7/1999 | Shibayama | 359/686 |
| 5,966,246 A | * | 10/1999 | Yoshikawa | 359/686 |
| 6,002,528 A | * | 12/1999 | Tomita | 359/684 |
| 6,124,982 A | | 9/2000 | Usui | |
| 6,512,637 B1 | | 1/2003 | Tomita | |

(Continued)

FOREIGN PATENT DOCUMENTS

| | | |
|---|---|---|
| JP | 08-146293 | 6/1996 |
| JP | 08-146294 | 6/1996 |

(Continued)

OTHER PUBLICATIONS

International Search Report PCT/JP2012/005562 dated Dec. 25, 2012.

*Primary Examiner* — Evelyn A. Lester
(74) *Attorney, Agent, or Firm* — Young & Thompson

(57) ABSTRACT

A zoom lens includes a positive first lens group fixed during zooming, a negative second lens moved to the image side upon zooming from the wide angle end to the telephoto end, a negative third lens group for image plane correction during zooming, and a positive fourth lens group fixed during zooming. The first lens group is composed of a negative first lens group front group, a positive first lens group middle group, and a positive first lens group rear group, disposed in order from the object side. The first lens group front group is composed of two negative lenses and one positive lens, disposed in order from the object side. Focusing is performed by moving only the first lens group middle group in an optical axis direction. The zoom lens satisfies a predetermined conditional expression.

8 Claims, 12 Drawing Sheets

(56) References Cited

U.S. PATENT DOCUMENTS

| | | | |
|---|---|---|---|
| 6,940,656 B2 * | 9/2005 | Oomura et al. | 359/687 |
| 7,085,069 B2 * | 8/2006 | Toyama | 359/684 |
| 7,417,802 B2 * | 8/2008 | Horiuchi | 359/687 |
| 7,589,909 B2 * | 9/2009 | Ikeda | 359/688 |
| 7,817,345 B2 * | 10/2010 | Inoko | 359/682 |
| 8,169,533 B2 * | 5/2012 | Sakamoto | 359/687 |
| 8,619,372 B2 * | 12/2013 | Yamaguchi | 359/684 |
| 2001/0033429 A1 * | 10/2001 | Yahagi | 359/684 |
| 2006/0007256 A1 | 1/2006 | Tanaka et al. | |
| 2009/0046375 A1 | 2/2009 | Wakazono et al. | |
| 2009/0091842 A1 * | 4/2009 | Ikeda | 359/684 |
| 2009/0290229 A1 | 11/2009 | Kodaira et al. | |
| 2012/0300118 A1 * | 11/2012 | Shimomura et al. | 359/686 |

FOREIGN PATENT DOCUMENTS

| | | |
|---|---|---|
| JP | 09-15501 | 1/1997 |
| JP | 11-30749 | 2/1999 |
| JP | 2000-321496 | 11/2000 |
| JP | 2001-021804 | 1/2001 |
| JP | 2001-116993 | 4/2001 |
| JP | 2009-042346 | 2/2009 |
| JP | 2009-282201 | 12/2009 |
| JP | 2009-282202 | 12/2009 |

* cited by examiner

FIG.2
EXAMPLE 1
WIDE ANGLE END
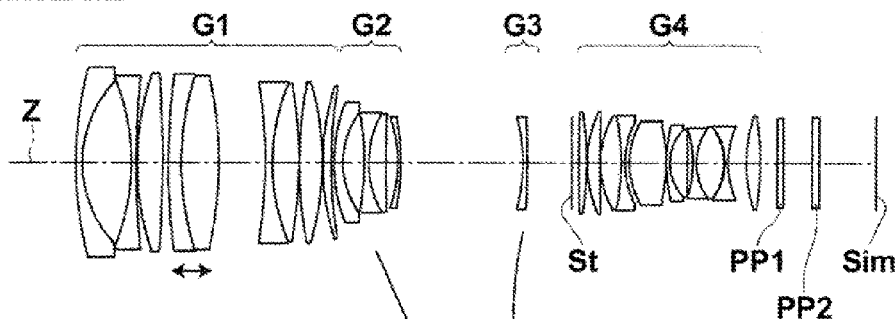
INTERMEDIATE
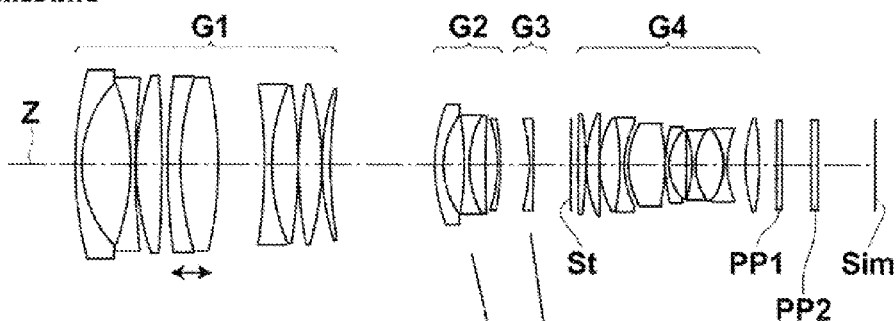
TELEPHOTO END
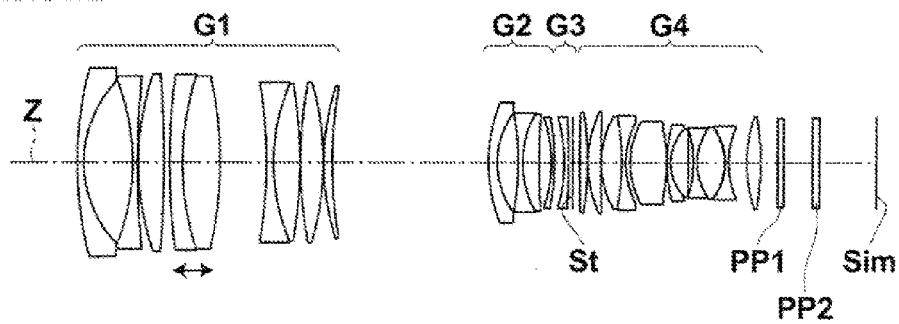

FIG.3
EXAMPLE 2
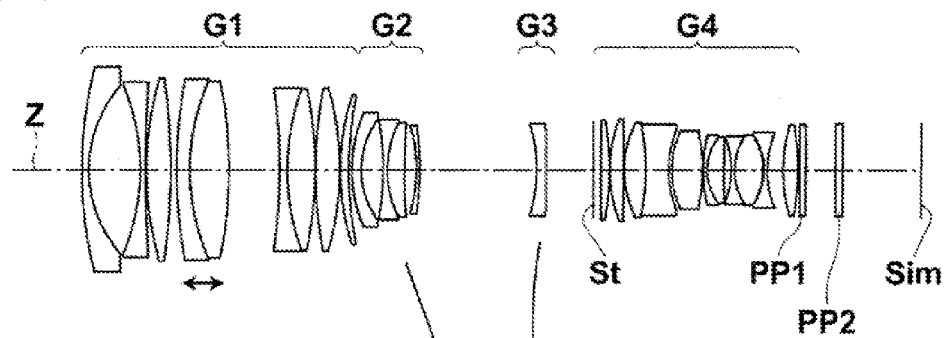
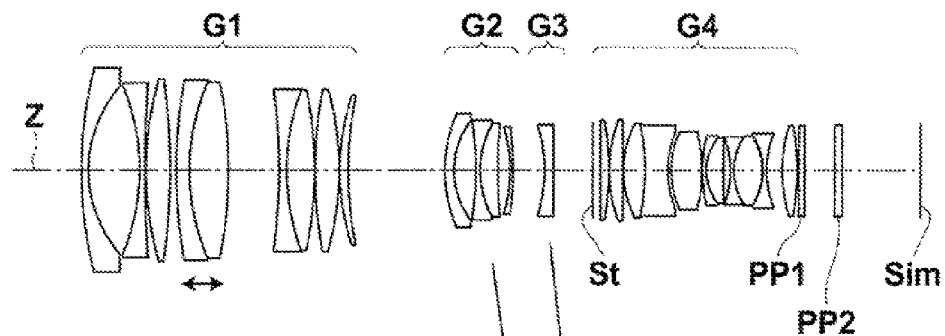
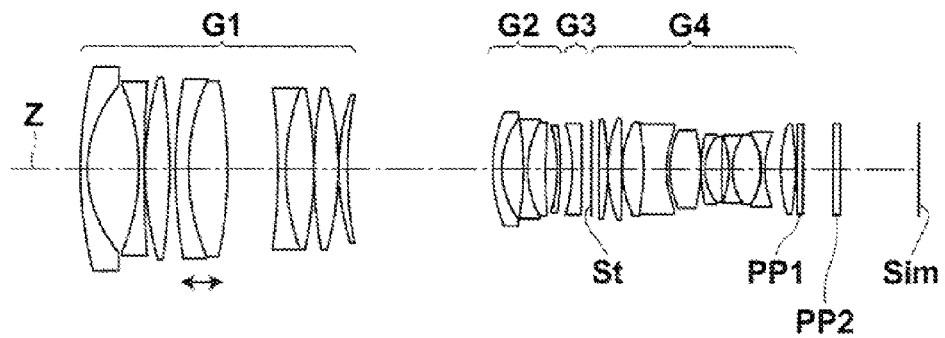

FIG.4
EXAMPLE 3
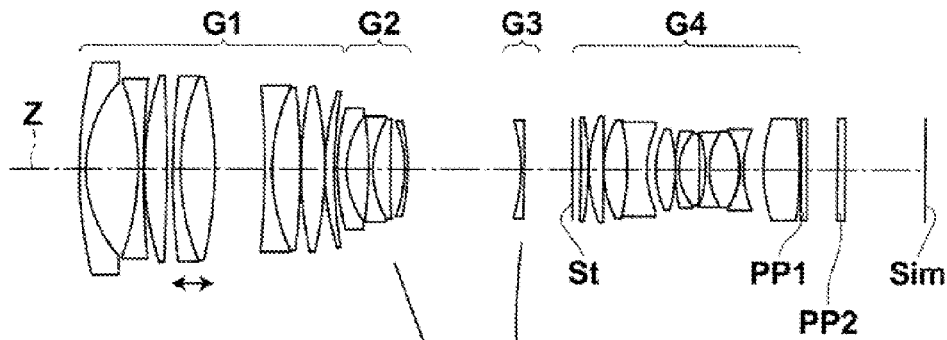
WIDE ANGLE END
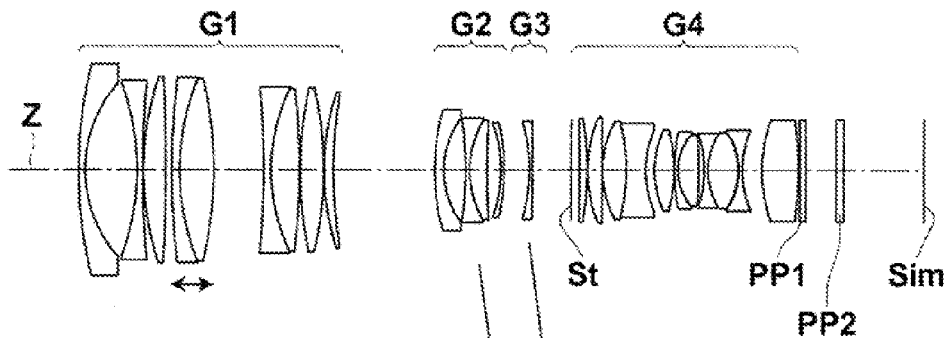
INTERMEDIATE
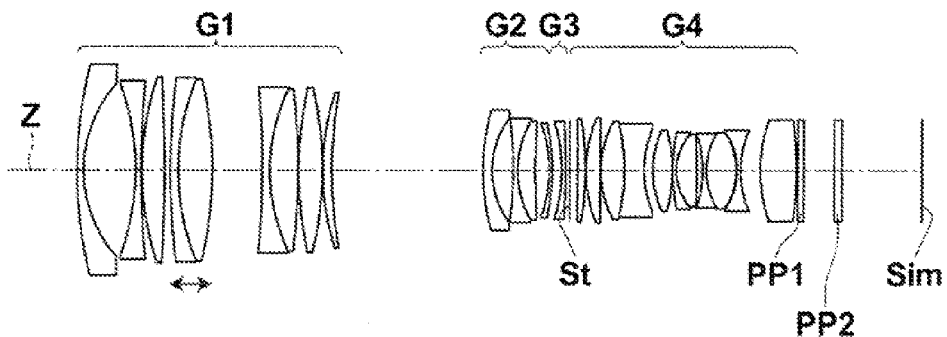
TELEPHOTO END

FIG.5
EXAMPLE 4
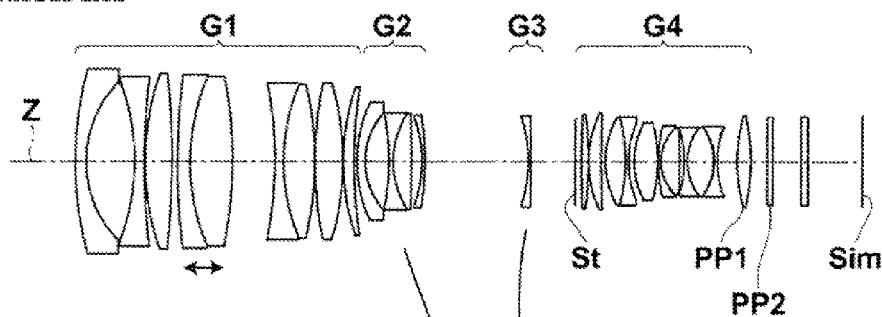
WIDE ANGLE END
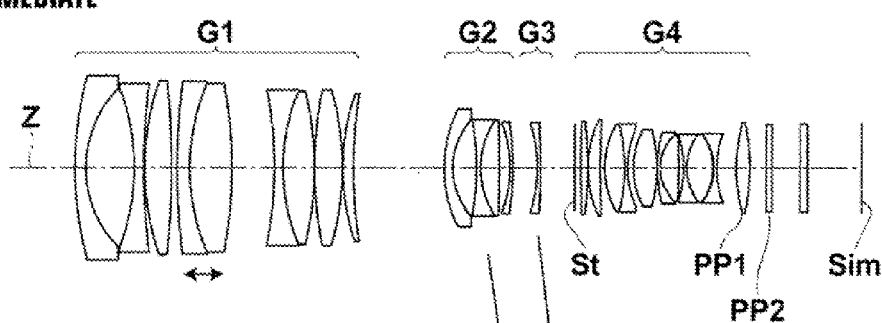
INTERMEDIATE
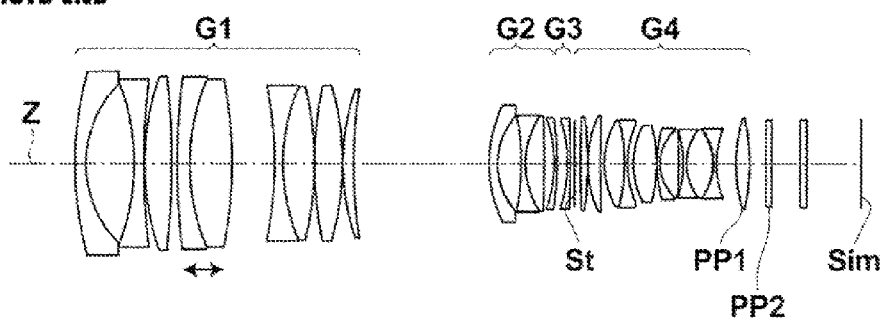
TELEPHOTO END FIG.6
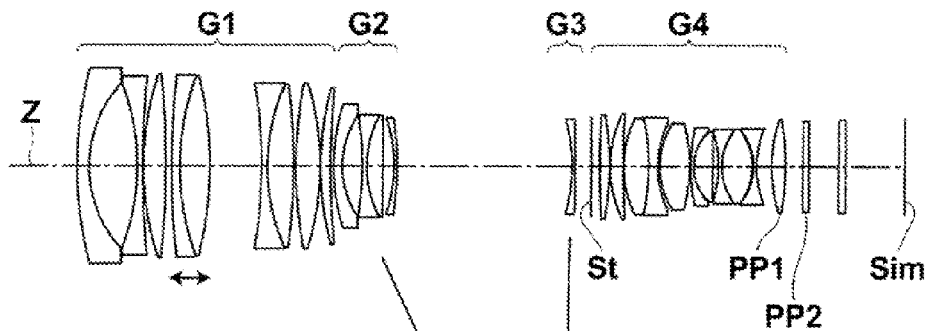
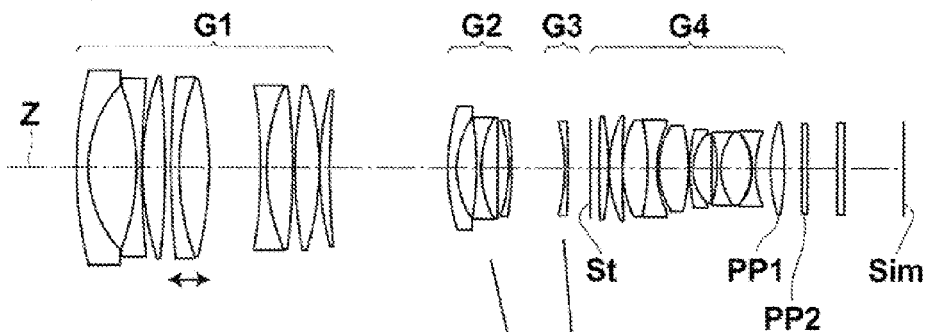
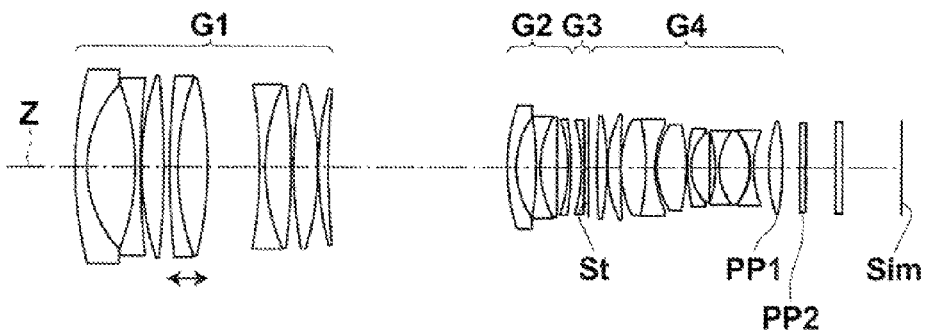

ZOOM LENS AND IMAGING APPARATUS

TECHNICAL FIELD

The present invention relates to a zoom lens and an imaging apparatus, and more particularly to a zoom lens preferably used in digital cameras, video cameras, broadcasting cameras, and the like and an imaging apparatus provided with the zoom lens.

BACKGROUND ART

Heretofore, zoom lenses are used in the cameras of the aforementioned fields. Among them, as a lens type having less variation in the angle of view during focusing and less variation in the F-number during zooming, a zoom lens which includes a first lens group having a positive refractive power and fixed during zooming, a second lens group having a negative refractive power, a third lens group having a negative refractive power, and a fourth lens group having a positive refractive power and fixed during zooming disposed in order from the object side, in which the first lens group is composed of three lens groups of a lens group having a negative refractive power and fixed during focusing, a lens group having a positive refractive power and moved during focusing, and a lens group having a positive refractive power and fixed during focusing, disposed in order from the object side is proposed (for example, refer to Japanese Unexamined Patent Publication No. 11(1999)-030749, Japanese Unexamined Patent Publication No. 2001-021804, and Japanese Unexamined Patent Publication No. 2001-116993).

DISCLOSURE OF THE INVENTION

In the mean time, cameras have increasingly been used by the users by putting them on their shoulders or carried in recent years. The zoom lenses described in Patent Documents 1 to 3 have high zoom ratios but some improvements are required in the size and weight in order to meet such usage conditions. In the cameras of the aforementioned fields, it is demanded that the variation in the angle of view is small during focusing.

The present invention has been developed in view of the circumstances described above and it is an object of the present invention to provide a zoom lens having less variation in the angle of view during focusing and high optical performance while being small and light and an imaging apparatus provided with the zoom lens.

A first zoom lens of the present invention substantially consists of four lens groups, composed of a first lens group having a positive refractive power, a second lens group having a negative refractive power, a third lens group having a negative refractive power, and a fourth lens group having a positive refractive power, disposed in order from the object side, wherein:

upon zooming from the wide angle end to the telephoto end, the first lens group and the fourth lens group are fixed in an optical axis direction, the second lens group is moved to the image side, and the third lens group is moved so as to correct an image plane variation due to the movement of the second lens group;

the first lens group is substantially consists of three lens groups, composed of a first lens group front group having a negative refractive power, a first lens group middle group having a positive refractive power, and a first lens group rear group having a positive refractive power, disposed in order from the object side;

the first lens group front group substantially consists of three lenses, composed of two negative lenses and one positive lens, disposed in order from the object side;

the zoom lens is configured such that focusing is performed by moving only the first lens group middle group in an optical axis direction; and the zoom lens satisfies a conditional expression (1) given below:

$$2.5 < f1/fw < 5.4 \qquad (1),$$

where:

f1: the focal length of the first lens group; and fw: the focal length of the entire system at the wide angle end.

The first zoom lens of the present invention preferably satisfies a conditional expression (2) given below:

$$2.5 < t1/fw < 14.0 \qquad (2),$$

where, t1: the distance from the most object side surface of the first lens group to the most image side surface of the first lens group on the optical axis.

A second zoom lens of the present invention substantially consists of four lens groups, composed of a first lens group having a positive refractive power, a second lens group having a negative refractive power, a third lens group having a negative refractive power, and a fourth lens group having a positive refractive power disposed in order from the object side, wherein:

upon zooming from the wide angle end to the telephoto end, the first lens group and the fourth lens group are fixed in an optical axis direction, the second lens group is moved to the image side, and the third lens group is moved so as to correct an image plane variation due to the movement of the second lens group;

the first lens group is substantially consists of three lens groups, composed of a first lens group front group having a negative refractive power, a first lens group middle group having a positive refractive power, and a first lens group rear group having a positive refractive power, disposed in order from the object side;

the first lens group front group substantially consists of three lenses, composed of two negative lenses and one positive lens, disposed in order from the object side;

the zoom lens is configured such that focusing is performed by moving only the first lens group middle group in an optical axis direction; and the zoom lens satisfies a conditional expression (2) given below:

$$2.5 < t1/fw < 14.0 \qquad (2),$$

where:

t1: the distance from the most object side surface of the first lens group to the most image side surface of the first lens group on the optical axis; and fw: the focal length of the entire system at the wide angle end.

In the first and the second zoom lenses of the present invention, the first lens group middle group is preferably composed of a cemented lens in which a negative lens and a positive lens are cemented.

In the first and the second zoom lenses of the present invention, the first lens group rear group is preferably composed of a cemented lens in which a biconcave lens and a biconvex lens are cemented, a biconvex lens, and a positive meniscus lens, disposed in order from the object side.

The first and the second zoom lenses of the present invention preferably satisfy a conditional expression (1') given below:

$$2.5 < f1/fw < 3.5 \qquad (1'),$$

where f1: the focal length of the first lens group.

The first and the second zoom lenses of the present invention preferably satisfy a conditional expression (2') given below:

$$2.5 < t1/fw < 4.0 \qquad (2'),$$

where t1: the distance from the most object side surface of the first lens group to the most image side surface of the first lens group on the optical axis.

The term "substantially consists of - - - " in the phrases of "substantially consists of four lens groups", "substantially consists of three lens groups", and "substantially consists of three-lenses" as used herein intends to include a lens having substantially no refractive power, an optical element other than a lens, such as an aperture stop, a cover glass, and the like, a lens flange, a lens barrel, an image sensor, a mechanical component, such as a camera shake correction mechanism, and the like, other than the lens groups and the lenses cited as the constituent elements.

The term "lens group" as used herein refers to include not only a lens group composed of a plurality of lenses but also a lens group composed of only one lens.

Note that the surface shape and the sign of the refractive powers of the aforementioned lenses are decided within the paraxial region for those having an aspherical surface.

The imaging apparatus of the present invention includes the first or the second zoom lens of the present invention.

According to the first zoom lens of the present invention, in a lens system composed of a positive first lens group fixed during zooming, a negative second lens group, a negative third lens group, and a positive fourth lens group fixed during zooming and, upon zooming from the wide angle end to the telephoto end, the second lens group is moved to the image side and the third lens group is moved so as to correct an image plane variation due to the movement of the second lens group, the first lens group is composed of a negative first lens group front group, a positive first lens group middle group, and a positive first lens group rear group, disposed in order from the object side, the lens arrangement of the first lens group front group is made appropriate, focusing is performed only by the first lens group middle group, and the conditional expression (1) is satisfied. This may realize a zoom lens having less variation in the angle of view during focusing and high optical performance through satisfactory correction of aberrations while being small and light.

According to the second zoom lens of the present invention, in a lens system composed of a positive first lens group fixed during zooming, a negative second lens group, a negative third lens group, and a positive fourth lens group fixed during zooming and, upon zooming from the wide angle end to the telephoto end, the second lens group is moved to the image side and the third lens group is moved so as to correct an image plane variation due to the movement of the second lens group, the first lens group is composed of a negative first lens group front group, a positive first lens group middle group, and a positive first lens group rear group, disposed in order from the object side, the lens arrangement of the first lens group front group is made appropriate, focusing is performed only by the first lens group middle group, and the conditional expression (2) is satisfied. This may realize a zoom lens having less variation in the angle of view during focusing and high optical performance through satisfactory correction of aberrations while being small and light.

The imaging apparatus of the present invention includes the first or the second zoom lens of the present invention, so that the apparatus may be constructed small and light with less variation in the angle of view during focusing and satisfactory imaging performance.

BRIEF DESCRIPTION OF DRAWINGS

FIG. 2 is a cross-sectional view of a zoom lens according to an Example 1, illustrating the lens configuration thereof.

FIG. 3 is a cross-sectional view of a zoom lens according to an Example 2, illustrating the lens configuration thereof.

FIG. 4 is a cross-sectional view of a zoom lens according to an Example 3, illustrating the lens configuration thereof.

FIG. 5 is a cross-sectional view of a zoom lens according to an Example 4, illustrating the lens configuration thereof.

FIG. 6 is a cross-sectional view of a zoom lens according to an Example 5, illustrating the lens configuration thereof.

BEST MODE FOR CARRYING OUT THE INVENTION

Figure 1:
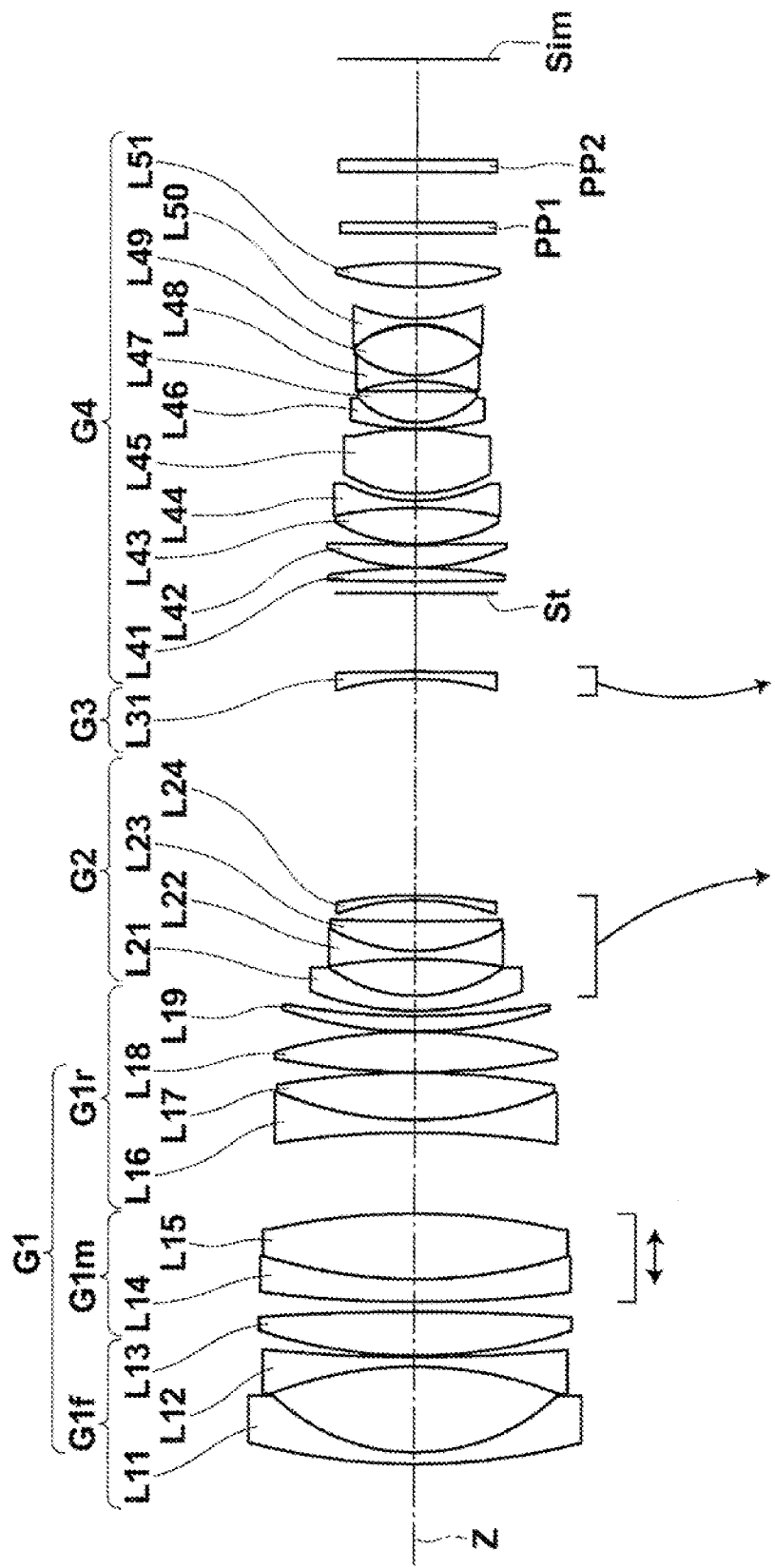
FIG. 1 is a cross-sectional view of a zoom lens according to an embodiment of the present invention, illustrating the lens configuration thereof.

Hereinafter, embodiments of the present invention will be described in detail with reference to the accompanying drawings. FIG. 1 is a cross-sectional view of a zoom lens according to an embodiment of the present invention, illustrating a configuration example, which corresponds to a zoom lens of Example 1 to be described later. In FIG. 1, the left side is the object side and the right side is the image side, illustrating the lens arrangement in infinity focusing state at the wide angle end.

The zoom lens according to the present embodiment, substantially consists of four lens groups, composed of a first lens group G1 having a positive refractive power, a second lens group G2 having a negative refractive power, a third lens group having a negative refractive power, and a fourth lens group having a positive refractive power, disposed in order from the object side.

Note that FIG. 1 illustrates an example in which parallel plate optical members PP1 and PP2 are disposed between the fourth lens group G4 and the image plane Sim. Some imaging devices in recent years employ a three-CCD system that uses a CCD for each color in order to improve image quality, and a color separation optical system, such as a color separation prism or the like, will be inserted between the lens system and the image plane Sim in order to accommodate the three-CCD system. Further, when applying the zoom lens to an imaging apparatus, it is preferable that a cover glass and various types of filters, such as a low-pass filter, an infrared cut filter, and the like, are disposed between the optical system and the image plane Sim according to the structure on the camera side on which the zoom lens is mounted. The optical members PP1 and PP2 assume such a color separation optical system, a cover glass, various types of filters, and the like.

The zoom lens is configured such that, upon zooming from the wide angle end to the telephoto end, the first lens group G1 and the fourth lens group G4 are fixed relative to the image plane Sim in the optical axis direction, the second lens group G2 is moved to the image side along the optical axis Z, and the third lens group G3 is moved so as to correct an image plane variation due to the movement of the second lens group G2. FIG. 1 schematically illustrates the movement trajectories of the second lens group G2 and the third lens group G3 upon zooming from the wide angle end to the telephoto end by the solid lines below each lens group.

For example, the third lens group G3 may be configured so as to move to the object side first and then to the image side upon zooming from the wide angle end to the telephoto end. If that is the case, the moving space required for the third lens group G3 upon zooming may be reduced, thereby contributing to the downsizing in the optical axis direction.

The first lens group G1 is composed of three lens groups of a first lens group front group G1f having a negative refractive power, a first lens group middle group G1m having a positive refractive power, and a first lens group rear group G1r, disposed in order from the object side. In a four group zoom lens as described above, the lens type in which the first lens group G1 is composed of such three lens groups may reduce the variation in the angle of view during focusing.

The first lens group front lens G1f acts to refract a peripheral light beam inputted from the object side such that the angle formed by the peripheral light beam outputted from the first lens group front lens G1f with the optical axis Z is reduced. This action may reduce the amount of change in the ray height of the peripheral light beam at the first lens group middle group G1m. In the mean time, the ray height is increased in the first lens group G1 with respect to the axial light beam and the amount of spherical aberration tends to increase, so that the arrangement is made to satisfactorily correct the spherical aberration by the first lens group rear group G1r.

The zoom lens employs a so-called inner focusing method so that only the first lens group middle group G1m is moved upon focusing. A double-headed arrow is provided below the first lens group middle group G1m in FIG. 1 to indicate this. Focusing implemented by the movement of only the first lens group middle group G1m having less amount of change in the ray height of a peripheral light beam in axial directions may reduce the variations in the angle of view and aberrations during focusing, whereby the performance change due to the focusing may be inhibited.

As illustrated in FIG. 1, the first lens group front group G1f is composed of two negative lenses L11, L12 and one positive lens L13 disposed in order from the object side. Configuration of the most object side lens group of the first lens group G1 in the manner as described above allows the diameter of the first lens group G1 to be reduced.

The first lens group middle group G1m may be formed, for example, of one set of cemented lenses in which a negative lens L14 and a positive lens L15 are cemented. If the first lens group middle group G1m is arranged in the manner as described above, the variation in the chromatic aberration during focusing may be reduced while realizing the downsizing.

When forming the first lens group middle group G1m with one set of cemented lenses, it is preferable that a negative lens and a positive lens are disposed in order from the object side. If that is the case, correction of chromatic aberration becomes easy when the object distance is changed. Further, these lenses preferably are a negative meniscus lens with a convex surface on the object side and a biconvex lens respectively and, if that is the case, correction of chromatic aberration becomes easier when the object distance is changed.

As illustrated in FIG. 1, the first lens group rear group G1r may be composed of a cemented lens in which a lens L16 having a biconcave shape and a lens L17 having a biconvex shape are cemented, a lens L18 having a biconvex shape, and a lens L19 having a positive meniscus shape, disposed in order from the object side. If the first lens group rear group G1r is formed in this way, the amount of spherical aberration generated at the telephoto end may be reduced.

The zoom lens illustrated in FIG. 1 reduces the variation in the angle of view during focusing by forming the first lens group G1 with the aforementioned lenses L11 to L19 and appropriately setting the power distribution within the first lens group G1 composed of a first lens group front group G1f, a first lens group middle group G1m, and a first lens group rear group G1r.

Further, the power distribution of the first lens group G1 to the entire system is also important and the zoom lens preferably satisfies a conditional expression (1) given below:

$$2.5 < f1/fw < 5.4 \quad (1),$$

where:
f1: the focal length of the first lens group; and
fw: the focal length of the entire system at the wide angle end.

If the zoom lens falls below the lower limit of the conditional expression (1), the refractive power of the first lens group G1 becomes excessive, thereby causing difficulty in correcting astigmatism and field curvature at the wide angle end and spherical aberration at the telephoto end. If the zoom lens exceeds the upper limit of the conditional expression (1), the refractive power of the first lens group G1 becomes weak, so that the overall length of the lens system becomes long, the distance from the aperture stop St to the first lens group G1 is increased, the lens diameter and thickness of the first lens group G1 are increased, resulting in an increased weight. When the length in the optical axis direction and the diameter of the first lens group G1 are increased so as the weights of lens holding members, such as the lens barrel and the like. The zoom lens may satisfactorily correct aberrations while achieving reduced size and weight by satisfying the conditional expression (1).

In view of the circumstances described above, the zoom lens preferably satisfies a conditional expression (1') given below in place of the conditional expression (1):

$$2.5 < f1/fw < 3.5 \quad (1').$$

Further, the zoom lens preferably satisfies a conditional expression (2) given below:

$$2.5 < t1/fw < 14.0 \quad (2),$$

where:
t1: the distance from the most object side surface of the first lens group G1 to the most image side surface of the first lens group G1 on the optical axis; and
fw: the focal length of the entire system at the wide angle end.

If the zoom lens falls below the lower limit of the conditional expression (2), the air space for focusing can not be secured and the shortest focusable distance can not be reduced. If the zoom lens exceeds the upper limit of the conditional expression (2), the length of the first lens group G1 in the optical axis direction becomes long and the thickness of the first lens group G1 is increased as well as the diameter and the weight. The zoom lens may maintain a wide range of imaging distances while achieving reduced size and weight.

In view of the circumstances described above, the zoom lens preferably satisfies a conditional expression (2') given below in place of the conditional expression (2):

$$2.5 < t1/fw < 4.0 \quad (2')$$

The second lens group G2 may be, for example, a four lens configuration in which negative lenses L21, L22, a positive lens L23, and a negative lens L24 are disposed in order from the object side, as in the example illustrated in FIG. 1. Here, the negative lens L22 and the positive lens L23 may be cemented. Further, at least either one of the surfaces may be an aspherical surface, and if formed in this way, the variation in aberrations during zooming may be inhibited easily.

In the example illustrated in FIG. 1, only the object side surface of the lens L21 of the second lens group G2 is formed in an aspherical shape in the entire system and all the other lens surfaces are spherical. Provision of the aspherical surface in the second lens group G2 rather than in the first lens group G1 having a larger diameter allows cost reduction. In the zoom lens of the present invention, the surface on which the aspherical surface is provided is not limited to the aforementioned example and, for example, another surface may also be formed in an aspherical shape, and if that is the case, aberrations may be corrected more satisfactorily.

The third lens group G3 may be, for example, composed of a negative lens L31, as in the example illustrated in FIG. 1. The single lens configuration of the third lens group G3 which is moved during zooming allows the drive mechanism to be simplified, whereby reduced size and weight of the apparatus may be achieved.

The fourth lens group G4 may be, for example, an eleven lens configuration in which positive lenses L41, L42, L43, L44, and L45, a negative lens L46, a positive lens L47, a negative lens L48, a positive lens L49, a negative lens L50, and a positive lens L51 are disposed in order from the object side, as in the example illustrated in FIG. 1.

Preferably, the aperture stop St is disposed on the image side of the third lens group G3 and fixed during zooming. Such arrangement allows the F-number to be maintained constant during zooming. For example, in the example illustrated in the FIG. 1, the aperture stop St is disposed between the third lens group G3 and the fourth lens group G4. The aperture stop St shown in FIG. 1 does not necessarily represent the size and shape but rather indicates the position on the optical axis Z.

Preferably, the preferable and possible configurations described above are employed appropriately as required. As described above, according to the zoom lens of the present embodiment, the variation in the angle of view during focusing may be minimized and high optical performance may be provided while achieving reduced size and weight. The zoom lens of the present embodiment is preferable as a zoom lens with a zoom magnification of about 2.5 to 3 and a total angle of view of about 60° at the wide angle end.

In the case where the present zoom lens is used under sever environments, a multi-layer coating is preferably provided for protection. Further, an antireflective coating for reducing ghost light when used may also be provided other than the protection coating.

FIG. 1 illustrates an example case in which optical members PP1 and PP2 are disposed between the lens system and image forming surface but, instead of disposing various types of filters, such as a low-pass filter, a filter that will cut a particular wavelength range, and the like, the filters may be disposed between each lens or a coating having an identical effect to that of the filter may be provided on a lens surface of any of the lenses.

Numerical Examples of the zoom lens of the present invention will now be described. Hereinafter, description will be made with reference mainly to those of Example 1, but the method of illustration, the method of representation, the meanings of symbols, and the like are basically the same for other Examples and repeated explanation will be omitted.

Lens cross-sectional views of zoom lenses of Example 1 to 5 when focused on an object at infinity are illustrated in FIGS. 2 to 6 respectively. The lens arrangements of the zoom lens of Example 1 at the wide angle end, at the intermediate focal length state, and at the telephoto end are illustrated in the upper part, the middle part, and the lower part of FIG. 2 respectively. The moving directions of the second lens group G2 and the third lens group G3, which are the groups moved during zooming, are schematically illustrated by the arrows below each lens group between the upper and the middle parts, and between the middle and the lower parts. Further, a double headed arrow is provided below the cemented lens corresponding to the first lens group middle group to indicate that it is moved during focusing.

Various data of the zoom lenses of Examples 1 to 5 are shown in Tables 1 to 15 provided hereinafter. Basic lens data of the zoom lens of Example 1 when focused on an object at infinity are shown in Table 1. In Table 1, the Si column indicates $i^{th}$ surface number in which a number i (i=1, 2, 3, - - - ) is given to each surface in a serially increasing manner toward the image side with the object side surface of the most object side component being taken as the first surface. The Ri column indicates the radius of curvature of $it^{th}$ surface and the Di column indicates the surface distance between $i^{th}$ surface and $(i+1)^{th}$ surface on the optical axis Z. Note that the numerical value at the bottom of the Di column indicates the surface distance between the final surface in the table and the image plane Sim. Also, note that the sign of the radius of curvature is positive if the surface shape is convex on the object side and negative if it is convex on the image side.

Further, in the basic lens data, the Ndj column indicates the refractive index of $j^{th}$ component with respect to the d-line (587.6 nm) in which a number j (j=1, 2, 3, - - - ) is given to each component in a serially increasing manner toward the image side with the most object side component being taken as the first component, and the vdj column indicates the Abbe number of $j^{th}$ component with respect to the d-line, and the θg, Fj column indicates the partial dispersion ratio between the g-line (wavelength of 435.8 nm) and F-line of $j^{th}$ component. The term "partial dispersion ratio between the g-line and the F-line" is the ratio represented, when the refractive index at the g-line is taken as Ng, the refractive index at the F-line (wavelength of 486.1 nm) is taken as NF, and the refractive index at the C-line (wavelength of 656.3 nm) is taken as NC, by (Ng−NF)/(NF−NC).

Note that the basic lens data include an aperture stop St and optical members PP1, PP2, and the symbol (St) is also indicated in the row of the surface number of the surface corresponding to the aperture stop St.

The distances between the first lens group G1 and the second lens group G2, between the second lens group G2 and the third lens group G3, and between the third lens group G3 and the aperture stop St change during zooming, and DD[16], DD[23], DD[25] are indicated in the rows of the surface distance column corresponding to these in Table 1. Further, * mark is attached to the surface number of an aspherical surface and the value of paraxial radius of curvature is shown as the radius of curvature of the aspherical surface.

Table 2 shows specs and zoom distances of the zoom lens of Example 1 at the wide angle end, in the intermediate focal distance state, and at the telephoto end. The table of specs indicates the values of zoom magnification (zoom ratio), focal length of the entire system f, back focus Bf (air equivalent distance), F-number Fno., and half angle of view ω. The values in the table of specs are those with respect to the d-line. The table of zoom distance shows values of surface distances of the aforementioned DD[16], DD[23], DD[25].

Table 3 shows the surface numbers of aspherical surfaces of the zoom lens of Example 1 and aspherical surface coefficients of the aspherical surfaces. The "E-n" (n: integer) in the values of aspherical surface coefficients represents "$\times 10^{-n}$". The aspherical surface coefficients represent values of coefficients K and Am (m=4, 6, 8, 10, 12, 14, 16, 18, and 20) in an aspherical surface expression given below:

$$Zd = \frac{C \times Y^2}{1 + \sqrt{1 - K \times C^2 \times Y^2}} + \sum_m A_m Y^m$$

where:

Zd: depth of aspherical surface (length of vertical line extended from a point on the aspherical surface at height Y to a flat surface orthogonal to the optical axis to which the aspherical apex contacts);

Y: height (distance from the optical axis to the lens surface);

C: paraxial curvature; and

K, Am: aspherical surface coefficients (m=4, 6, 8, 10, 12, 14, 16, 18, and 20).

Values rounded to a predetermined digit are shown in the following tables. Further, in the data of the tables shown below, degree is used as the unit of angle and mm is used as the unit of length, but other appropriate units may also be used, as optical systems are usable even when they are proportionally increased or decreased.

TABLE 1

Example 1
Basic Lens Data

| Si | Ri | Di | Ndj | vdj | θg, Fj |
|---|---|---|---|---|---|
| 1 | 130.036 | 2.300 | 1.72916 | 54.68 | 0.54451 |
| 2 | 40.997 | 17.030 | | | |
| 3 | −78.739 | 1.900 | 1.80400 | 46.58 | 0.55730 |
| 4 | 308.197 | 0.300 | | | |
| 5 | 98.552 | 8.700 | 1.80519 | 25.46 | 0.61013 |
| 6 | −439.889 | 1.995 | | | |
| 7 | 241.326 | 4.520 | 1.69895 | 30.13 | 0.60298 |
| 8 | 102.050 | 13.000 | 1.61800 | 63.33 | 0.54414 |
| 9 | −133.540 | 16.043 | | | |
| 10 | −175.448 | 2.520 | 1.80610 | 33.27 | 0.58845 |
| 11 | 71.956 | 9.340 | 1.49700 | 81.54 | 0.53748 |
| 12 | −149.932 | 0.120 | | | |
| 13 | 150.711 | 7.960 | 1.61800 | 63.33 | 0.54414 |
| 14 | −100.243 | 0.120 | | | |
| 15 | 84.636 | 3.050 | 1.80610 | 33.27 | 0.58845 |
| 16 | 150.645 | DD[16] | | | |
| *17 | 60.816 | 3.000 | 1.74000 | 28.30 | 0.60790 |
| 18 | 29.686 | 7.270 | | | |
| 19 | −101.493 | 1.650 | 1.43875 | 94.93 | 0.53433 |
| 20 | 35.465 | 5.820 | 1.80519 | 25.46 | 0.61013 |

TABLE 1-continued

Example 1
Basic Lens Data

| Si | Ri | Di | Ndj | vdj | θg, Fj |
|---|---|---|---|---|---|
| 21 | 368.569 | 4.190 | | | |
| 22 | −47.735 | 1.000 | 1.75520 | 27.51 | 0.61033 |
| 23 | −84.061 | DD[23] | | | |
| 24 | −56.657 | 1.450 | 1.43875 | 94.93 | 0.53433 |
| 25 | −451.051 | DD[25] | | | |
| 26(St) | ∞ | 2.300 | | | |
| 27 | 562.249 | 2.740 | 1.62041 | 60.29 | 0.54266 |
| 28 | −110.533 | 0.120 | | | |
| 29 | 43.115 | 4.480 | 1.84139 | 24.56 | 0.61274 |
| 30 | 623.570 | 0.120 | | | |
| 31 | 32.642 | 7.160 | 1.43875 | 94.93 | 0.53433 |
| 32 | −83.689 | 1.390 | 1.88300 | 40.76 | 0.56679 |
| 33 | 32.047 | 1.510 | | | |
| 34 | 28.919 | 12.700 | 1.49700 | 81.54 | 0.53748 |
| 35 | −57.330 | 0.120 | | | |
| 36 | 54.963 | 1.210 | 1.84666 | 23.78 | 0.62054 |
| 37 | 16.959 | 6.200 | 1.51633 | 64.14 | 0.53531 |
| 38 | −591.089 | 1.940 | | | |
| 39 | −36.893 | 1.210 | 1.59551 | 39.24 | 0.58043 |
| 40 | 20.624 | 9.770 | 1.51633 | 64.14 | 0.53531 |
| 41 | −20.624 | 0.301 | | | |
| 42 | −19.496 | 1.100 | 1.51742 | 52.43 | 0.55649 |
| 43 | 32.724 | 6.230 | | | |
| 44 | 52.500 | 4.840 | 1.84139 | 24.56 | 0.61274 |
| 45 | −103.383 | 5.890 | | | |
| 46 | ∞ | 2.000 | 1.51632 | 64.00 | 0.53641 |
| 47 | ∞ | 10.000 | | | |
| 48 | ∞ | 2.490 | 1.51632 | 64.00 | 0.53641 |
| 49 | ∞ | 19.965 | | | |

TABLE 2

Example 1

| | Wide Angle End | Intermediate | Telephoto End |
|---|---|---|---|
| | Specs (d-line) | | |
| Zoom Magnification | 1.00 | 1.78 | 2.61 |
| f | 30.010 | 53.417 | 78.326 |
| Bf | 31.607 | 31.607 | 31.607 |
| Fno. | 2.65 | 2.65 | 2.65 |
| ω[°] | 28.5 | 16.2 | 11.2 |
| | Zoom Distance | | |
| DD[16] | 1.000 | 36.271 | 54.414 |
| DD[23] | 42.772 | 10.031 | 3.394 |
| DD[25] | 15.540 | 13.010 | 1.504 |

TABLE 3

Example 1
Aspherical Surface Coefficient

| | Surface Number 17 |
|---|---|
| K | 1.0000000E+00 |
| A4 | 4.7073044E−07 |
| A6 | 4.2292257E−09 |
| A8 | −5.7510268E−11 |
| A10 | 4.9498498E−13 |
| A12 | −2.5958644E−15 |
| A14 | 8.3139756E−18 |
| A16 | −1.5803235E−20 |
| A18 | 1.6303214E−23 |
| A20 | −6.9841776E−27 |

TABLE 4

Example 2
Basic Lens Data

| Si | Ri | Di | Ndj | vdj | θg, Fj |
|---|---|---|---|---|---|
| 1 | 139.137 | 2.300 | 1.77250 | 49.60 | 0.55212 |
| 2 | 42.296 | 16.980 | | | |
| 3 | −73.159 | 1.900 | 1.83481 | 42.73 | 0.56486 |
| 4 | 443.485 | 0.300 | | | |
| 5 | 111.851 | 7.950 | 1.80519 | 25.46 | 0.61013 |
| 6 | −217.194 | 1.997 | | | |
| 7 | 163.322 | 4.520 | 1.75520 | 27.51 | 0.61033 |
| 8 | 73.504 | 13.000 | 1.61800 | 63.33 | 0.54414 |
| 9 | −143.106 | 16.649 | | | |
| 10 | −199.990 | 2.520 | 1.90069 | 37.12 | 0.57587 |
| 11 | 79.362 | 9.240 | 1.49700 | 81.54 | 0.53748 |
| 12 | −127.268 | 0.120 | | | |
| 13 | 147.381 | 8.000 | 1.61800 | 63.33 | 0.54414 |
| 14 | −98.149 | 0.120 | | | |
| 15 | 77.431 | 2.980 | 1.83400 | 37.16 | 0.57759 |
| 16 | 129.234 | DD[16] | | | |
| *17 | 50.323 | 3.000 | 1.75520 | 27.51 | 0.61033 |
| 18 | 27.887 | 7.250 | | | |
| 19 | −98.271 | 1.410 | 1.43875 | 94.93 | 0.53433 |
| 20 | 33.679 | 5.810 | 1.80519 | 25.46 | 0.61013 |
| 21 | 226.867 | 3.990 | | | |
| 22 | −50.096 | 1.000 | 1.73800 | 32.26 | 0.58995 |
| 23 | −111.962 | DD[23] | | | |
| 24 | −50.394 | 3.000 | 1.43875 | 94.93 | 0.53433 |
| 25 | −2009.494 | DD[25] | | | |
| 26(St) | ∞ | 2.390 | | | |
| 27 | 935.036 | 2.900 | 1.51823 | 58.90 | 0.54567 |
| 28 | −92.148 | 0.120 | | | |
| 29 | 47.865 | 4.600 | 1.84139 | 24.56 | 0.61274 |
| 30 | −646.790 | 0.120 | | | |
| 31 | 34.026 | 7.240 | 1.43875 | 94.93 | 0.53433 |
| 32 | −74.173 | 7.480 | 1.90069 | 37.12 | 0.57587 |
| 33 | 33.882 | 1.080 | | | |
| 34 | 30.186 | 10.150 | 1.49700 | 81.54 | 0.53748 |
| 35 | −49.919 | 0.120 | | | |
| 36 | 50.373 | 1.210 | 1.84666 | 23.78 | 0.62054 |
| 37 | 16.918 | 5.750 | 1.51633 | 64.14 | 0.53531 |
| 38 | 779.953 | 2.300 | | | |
| 39 | −32.414 | 1.210 | 1.60342 | 38.03 | 0.58356 |
| 40 | 21.004 | 9.470 | 1.54451 | 63.29 | 0.54021 |
| 41 | −21.004 | 0.280 | | | |
| 42 | −19.989 | 1.100 | 1.53172 | 48.84 | 0.56309 |
| 43 | 33.243 | 5.230 | | | |
| 44 | 53.182 | 4.950 | 1.84139 | 24.56 | 0.61274 |
| 45 | −81.814 | 0.500 | | | |
| 46 | ∞ | 2.000 | 1.51632 | 64.00 | 0.53641 |
| 47 | ∞ | 10.000 | | | |
| 48 | ∞ | 2.490 | 1.51632 | 64.00 | 0.53641 |
| 49 | ∞ | 25.912 | | | |

TABLE 5

Example 2

| | Wide Angle End | Intermediate | Telephoto End |
|---|---|---|---|
| Specs (d-line) | | | |
| Zoom Magnification | 1.00 | 1.78 | 2.61 |
| f | 29.542 | 52.586 | 77.106 |
| Bf | 37.554 | 37.554 | 37.554 |
| Fno. | 2.65 | 2.65 | 2.65 |
| ω[°] | 28 | 15.9 | 11 |
| Zoom Distance | | | |
| DD[16] | 1.000 | 32.279 | 48.391 |
| DD[23] | 38.879 | 10.368 | 3.905 |
| DD[25] | 15.932 | 13.164 | 3.515 |

TABLE 6

Example 2
Aspherical Surface Coefficient

| | Surface Number |
|---|---|
| | 17 |
| K | 1.0000000E+00 |
| A4 | 4.7073044E−07 |
| A6 | 4.2292257E−09 |
| A8 | −5.7510268E−11 |
| A10 | 4.9498498E−13 |
| A12 | −2.5958644E−15 |
| A14 | 8.3139756E−18 |
| A16 | −1.5803235E−20 |
| A18 | 1.6303214E−23 |
| A20 | −6.9841776E−27 |

TABLE 7

Example 3
Basic Lens Data

| Si | Ri | Di | Ndj | vdj | θg, Fj |
|---|---|---|---|---|---|
| 1 | 149.047 | 2.100 | 1.75500 | 52.32 | 0.54765 |
| 2 | 43.188 | 17.150 | | | |
| 3 | −83.193 | 1.900 | 1.78800 | 47.37 | 0.55598 |
| 4 | 316.793 | 0.300 | | | |
| 5 | 100.740 | 7.260 | 1.80519 | 25.46 | 0.61013 |
| 6 | −559.242 | 1.954 | | | |
| 7 | 260.410 | 2.540 | 1.63980 | 34.46 | 0.59233 |
| 8 | 78.474 | 11.230 | 1.61800 | 63.33 | 0.54414 |
| 9 | −132.747 | 16.449 | | | |
| 10 | −295.273 | 2.520 | 1.74950 | 35.28 | 0.58704 |
| 11 | 62.071 | 9.440 | 1.49700 | 81.54 | 0.53748 |
| 12 | −224.540 | 0.120 | | | |
| 13 | 126.389 | 7.860 | 1.61800 | 63.33 | 0.54414 |
| 14 | −118.709 | 0.120 | | | |
| 15 | 85.085 | 3.000 | 1.83481 | 42.73 | 0.56486 |
| 16 | 149.604 | DD[16] | | | |
| *17 | 76.654 | 3.000 | 1.74000 | 28.30 | 0.60790 |
| 18 | 29.360 | 7.150 | | | |
| 19 | −124.258 | 1.410 | 1.43875 | 94.93 | 0.53433 |
| 20 | 32.941 | 5.830 | 1.80519 | 25.46 | 0.61013 |
| 21 | 351.592 | 4.590 | | | |
| 22 | −43.459 | 1.000 | 1.80000 | 29.84 | 0.60178 |
| 23 | −67.718 | DD[23] | | | |
| 24 | −53.899 | 1.060 | 1.43875 | 94.93 | 0.53433 |
| 25 | −551.301 | DD[25] | | | |
| 26(St) | ∞ | 2.630 | | | |
| 27 | −1000.165 | 2.550 | 1.65844 | 50.88 | 0.55612 |
| 28 | −99.514 | 0.120 | | | |
| 29 | 45.482 | 4.790 | 1.84139 | 24.56 | 0.61274 |
| 30 | 24543.640 | 0.120 | | | |
| 31 | 34.599 | 7.710 | 1.43875 | 94.93 | 0.53433 |
| 32 | −68.902 | 6.500 | 1.88300 | 40.76 | 0.56679 |
| 33 | 33.804 | 2.890 | | | |
| 34 | 32.288 | 6.440 | 1.49700 | 81.54 | 0.53748 |
| 35 | −50.120 | 0.120 | | | |
| 36 | 62.613 | 1.210 | 1.84666 | 23.78 | 0.62054 |
| 37 | 18.178 | 6.790 | 1.51633 | 64.14 | 0.53531 |
| 38 | −188.944 | 1.940 | | | |
| 39 | −36.668 | 1.210 | 1.62004 | 36.26 | 0.58800 |
| 40 | 23.014 | 9.950 | 1.56384 | 60.83 | 0.54082 |
| 41 | −23.014 | 0.280 | | | |
| 42 | −21.818 | 1.100 | 1.51742 | 52.43 | 0.55649 |
| 43 | 33.856 | 6.600 | | | |
| 44 | 53.440 | 11.700 | 1.84139 | 24.56 | 0.61274 |
| 45 | −127.291 | 0.500 | | | |
| 46 | ∞ | 2.000 | 1.51632 | 64.00 | 0.53641 |
| 47 | ∞ | 10.000 | | | |
| 48 | ∞ | 2.490 | 1.51632 | 64.00 | 0.53641 |
| 49 | ∞ | 26.584 | | | |

TABLE 8

Example 3

| | Wide Angle End | Intermediate | Telephoto End |
|---|---|---|---|
| Specs (d-line) | | | |
| Zoom Magnification | 1.00 | 1.78 | 2.61 |
| f | 31.723 | 56.467 | 82.797 |
| Bf | 38.226 | 38.226 | 38.226 |
| Fno. | 2.65 | 2.65 | 2.65 |
| ω[°] | 28.6 | 16.3 | 11.3 |
| Zoom Distance | | | |
| DD[16] | 1.000 | 33.329 | 49.827 |
| DD[23] | 37.599 | 8.430 | 3.129 |
| DD[25] | 15.797 | 12.637 | 1.440 |

TABLE 9

Example 3
Aspherical Surface Coefficient

| | Surface Number 17 |
|---|---|
| K | 1.0000000E+00 |
| A4 | 4.7073044E−07 |
| A6 | 4.2292257E−09 |
| A8 | −5.7510268E−11 |
| A10 | 4.9498498E−13 |
| A12 | −2.5958644E−15 |
| A14 | 8.3139756E−18 |
| A16 | −1.5803235E−20 |
| A18 | 1.6303214E−23 |
| A20 | −6.9841776E−27 |

TABLE 10

Example 4
Basic Lens Data

| Si | Ri | Di | Ndj | νdj | θg, Fj |
|---|---|---|---|---|---|
| 1 | 126.798 | 3.832 | 1.81600 | 46.62 | 0.55682 |
| 2 | 40.510 | 17.379 | | | |
| 3 | −79.608 | 3.501 | 1.81600 | 46.62 | 0.55682 |
| 4 | 254.994 | 0.299 | | | |
| 5 | 96.546 | 9.639 | 1.80519 | 25.46 | 0.61013 |
| 6 | −285.029 | 2.034 | | | |
| 7 | 251.752 | 4.521 | 1.63980 | 34.46 | 0.59233 |
| 8 | 77.796 | 14.999 | 1.61800 | 63.33 | 0.54414 |
| 9 | −165.520 | 15.155 | | | |
| 10 | −141.344 | 3.021 | 1.80610 | 33.27 | 0.58845 |
| 11 | 70.820 | 11.143 | 1.49700 | 81.54 | 0.53748 |
| 12 | −120.163 | 0.119 | | | |
| 13 | 142.972 | 10.000 | 1.61800 | 63.33 | 0.54414 |
| 14 | −99.294 | 0.119 | | | |
| 15 | 81.176 | 3.911 | 1.72047 | 34.71 | 0.58350 |
| 16 | 181.178 | DD[16] | | | |
| *17 | 51.628 | 2.999 | 1.84666 | 23.78 | 0.62054 |
| 18 | 26.227 | 8.452 | | | |
| 19 | −92.627 | 1.509 | 1.43875 | 94.93 | 0.53433 |
| 20 | 31.561 | 6.670 | 1.80519 | 25.46 | 0.61013 |
| 21 | −476.757 | 3.758 | | | |
| 22 | −45.171 | 0.999 | 1.80000 | 29.84 | 0.60178 |
| 23 | −105.698 | DD[23] | | | |
| 24 | −50.553 | 0.999 | 1.43875 | 94.93 | 0.53433 |
| 25 | −485.171 | DD[25] | | | |
| 26(St) | ∞ | 2.299 | | | |
| 27 | 583.611 | 2.375 | 1.80610 | 40.92 | 0.57019 |
| 28 | −133.574 | 0.120 | | | |
| 29 | 40.299 | 4.479 | 1.84139 | 24.56 | 0.61274 |
| 30 | 544.727 | 1.464 | | | |
| 31 | 32.391 | 7.095 | 1.43875 | 94.93 | 0.53433 |
| 32 | −60.132 | 0.999 | 1.88300 | 40.76 | 0.56679 |
| 33 | 33.438 | 2.174 | | | |
| 34 | 29.719 | 8.319 | 1.49700 | 81.54 | 0.53748 |
| 35 | −50.843 | 0.121 | | | |
| 36 | 50.566 | 1.011 | 1.84666 | 23.78 | 0.62054 |
| 37 | 16.349 | 6.614 | 1.51633 | 64.14 | 0.53531 |
| 38 | −223.801 | 1.636 | | | |
| 39 | −39.031 | 1.209 | 1.62588 | 35.70 | 0.58935 |
| 40 | 20.448 | 9.418 | 1.51633 | 64.14 | 0.53531 |
| 41 | −20.448 | 0.282 | | | |
| 42 | −19.348 | 0.999 | 1.54814 | 45.79 | 0.56359 |
| 43 | 34.719 | 7.057 | | | |
| 44 | 61.564 | 4.932 | 1.84139 | 24.56 | 0.61274 |
| 45 | −76.602 | 5.890 | | | |
| 46 | ∞ | 2.000 | 1.51632 | 64.00 | 0.53641 |
| 47 | ∞ | 10.000 | | | |
| 48 | ∞ | 2.490 | 1.51632 | 64.00 | 0.53641 |
| 49 | ∞ | 19.334 | | | |

TABLE 11

Example 4

| | Wide Angle End | Intermediate | Telephoto End |
|---|---|---|---|
| Specs (d-line) | | | |
| Zoom Magnification | 1.00 | 1.78 | 2.61 |
| f | 26.365 | 46.929 | 68.812 |
| Bf | 30.976 | 30.976 | 30.976 |
| Fno. | 2.65 | 2.65 | 2.65 |
| ω[°] | 31.7 | 18.3 | 12.7 |
| Zoom Distance | | | |
| DD[16] | 0.999 | 32.455 | 48.482 |
| DD[23] | 36.778 | 8.805 | 3.731 |
| DD[25] | 15.861 | 12.378 | 1.424 |

TABLE 12

Example 4
Aspherical Surface Coefficient

| | Surface Number 17 |
|---|---|
| K | 1.0000000E+00 |
| A4 | 1.0471412E−06 |
| A6 | 4.5871022E−09 |
| A8 | −5.7073608E−11 |
| A10 | 4.9525653E−13 |
| A12 | −2.5957697E−15 |
| A14 | 8.3137673E−18 |
| A16 | −1.5803584E−20 |
| A18 | 1.6303240E−23 |
| A20 | −6.9702889E−27 |

TABLE 13

Example 5
Basic Lens Data

| Si | Ri | Di | Ndj | νdj | θg, Fj |
|---|---|---|---|---|---|
| 1 | 130.511 | 4.001 | 1.78800 | 47.37 | 0.55598 |
| 2 | 41.342 | 16.247 | | | |
| 3 | −78.030 | 1.899 | 1.81600 | 46.62 | 0.55682 |
| 4 | 305.479 | 0.299 | | | |
| 5 | 99.255 | 7.524 | 1.80519 | 25.46 | 0.61013 |

TABLE 13-continued

Example 5
Basic Lens Data

| Si | Ri | Di | Ndj | vdj | θg, Fj |
|---|---|---|---|---|---|
| 6 | −309.490 | 1.998 | | | |
| 7 | 280.172 | 2.889 | 1.67270 | 32.10 | 0.59891 |
| 8 | 88.547 | 10.013 | 1.61800 | 63.33 | 0.54414 |
| 9 | −127.562 | 17.343 | | | |
| 10 | −164.905 | 2.019 | 1.80610 | 33.27 | 0.58845 |
| 11 | 68.704 | 8.722 | 1.49700 | 81.54 | 0.53748 |
| 12 | −225.344 | 0.814 | | | |
| 13 | 151.867 | 8.259 | 1.61800 | 63.33 | 0.54414 |
| 14 | −93.609 | 0.119 | | | |
| 15 | 103.593 | 3.332 | 1.80610 | 33.27 | 0.58845 |
| 16 | 286.890 | DD[16] | | | |
| *17 | 71.783 | 2.999 | 1.74000 | 28.30 | 0.60790 |
| 18 | 31.197 | 6.725 | | | |
| 19 | −104.276 | 1.509 | 1.43875 | 94.93 | 0.53433 |
| 20 | 36.587 | 5.548 | 1.80519 | 25.46 | 0.61013 |
| 21 | −3851.643 | 3.754 | | | |
| 22 | −49.311 | 0.999 | 1.75520 | 27.51 | 0.61033 |
| 23 | −109.278 | DD[23] | | | |
| 24 | −57.284 | 0.999 | 1.43875 | 94.93 | 0.53433 |
| 25 | −556.066 | DD[25] | | | |
| 26(St) | ∞ | 2.855 | | | |
| 27 | 312.916 | 3.320 | 1.62041 | 60.29 | 0.54266 |
| 28 | −93.127 | 0.119 | | | |
| 29 | 40.941 | 4.523 | 1.84139 | 24.56 | 0.61274 |
| 30 | 318.105 | 0.119 | | | |
| 31 | 37.495 | 8.328 | 1.43875 | 94.93 | 0.53433 |
| 32 | −76.941 | 3.001 | 1.88300 | 40.76 | 0.50679 |
| 33 | 32.522 | 0.761 | | | |
| 34 | 27.359 | 9.824 | 1.49700 | 81.54 | 0.53748 |
| 35 | −60.698 | 0.434 | | | |
| 36 | 61.206 | 1.056 | 1.84666 | 23.78 | 0.62054 |
| 37 | 16.306 | 6.448 | 1.58913 | 61.14 | 0.54067 |
| 38 | −693.358 | 1.850 | | | |
| 39 | −38.542 | 1.209 | 1.65412 | 39.68 | 0.57378 |
| 40 | 20.133 | 10.303 | 1.51633 | 64.14 | 0.53531 |
| 41 | −20.133 | 0.424 | | | |
| 42 | −18.826 | 0.999 | 1.53172 | 48.84 | 0.56309 |
| 43 | 34.141 | 5.098 | | | |
| 44 | 52.224 | 4.798 | 1.84139 | 24.56 | 0.61274 |
| 45 | −90.270 | 5.890 | | | |
| 46 | ∞ | 2.000 | 1.51632 | 64.00 | 0.53641 |
| 47 | ∞ | 10.000 | | | |
| 48 | ∞ | 2.490 | 1.51632 | 64.00 | 0.53641 |
| 49 | ∞ | 19.874 | | | |

TABLE 14

Example 5

| | Wide Angle End | Intermediate | Telephoto End |
|---|---|---|---|
| Specs (d-line) | | | |
| Zoom Magnification | 1.00 | 1.78 | 2.61 |
| f | 29.828 | 53.094 | 77.851 |
| Bf | 31.517 | 31.517 | 31.517 |
| Fno. | 2.65 | 2.65 | 2.66 |
| ω[°] | 28.6 | 16.3 | 11.3 |
| Zoom Distance | | | |
| DD[16] | 0.999 | 40.120 | 60.684 |
| DD[23] | 59.162 | 17.893 | 3.603 |
| DD[25] | 5.567 | 7.715 | 1.441 |

TABLE 15

Example 5
Aspherical Surface Coefficient

| | Surface Number 17 |
|---|---|
| K | 1.0000000E+00 |
| A4 | 4.7580100E−07 |
| A6 | 4.2122111E−09 |
| A8 | −5.7548324E−11 |
| A10 | 4.9481450E−13 |
| A12 | −2.5957294E−15 |
| A14 | 8.3158826E−18 |
| A16 | −1.5806240E−20 |
| A18 | 1.6302431E−23 |
| A20 | −6.9836702E−27 |

Each of Examples 1 to 5 is composed of a first lens group G1 having a positive refractive power, a second lens group G2 having a negative refractive power, a third lens group G3 having a negative refractive power, and a fourth lens group G4 having a positive refractive power, arranged in order from the object side, and configured such that, upon zooming from the wide angle end to the telephoto end, the first lens group G1 and the fourth lens group G4 are fixed relative to the image plane Sim in an optical axis direction, the second lens group G2 is moved to the image side along the optical axis Z, and the third lens group G3 is moved in an optical axis direction so as to correct an image plane variation due to the movement of the second lens group G2.

In each of Example 1 to 5, the first lens group G1 is composed of three lens groups of a first lens group front group G1f composed of two negative lenses and one positive lens disposed in order from the object side, a first lens group middle group G1m having a positive refractive power, and a first lens group rear group G1r having a positive refractive power, and is configured such that focusing is performed by moving only the first lens group middle group G1m in an optical axis direction.

Table 16 shows values corresponding to the conditional expressions (1) and (2) for the zoom lenses of Example 1 to 5. The values of Table 16 are those with respect to the d-line.

TABLE 16

| Conditional Expression | Example 1 | Example 2 | Example 3 | Example 4 | Example 5 |
|---|---|---|---|---|---|
| (1) f1/fw | 2.93 | 2.72 | 2.64 | 2.74 | 3.23 |
| (2) t1/fw | 2.96 | 3.00 | 2.65 | 3.78 | 2.87 |

Figure 7:
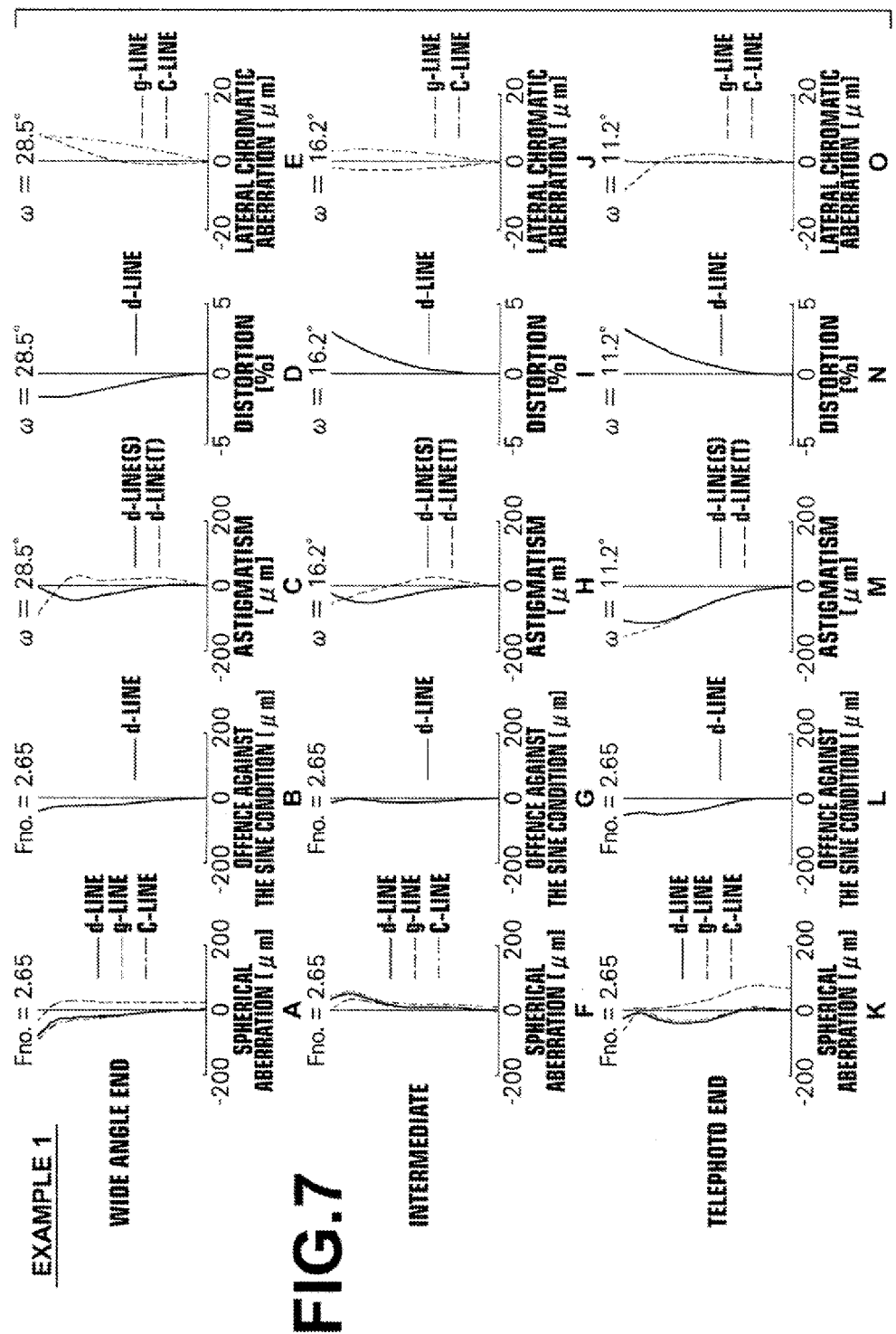
FIG. 7 show aberration diagrams A to O of the zoom lens of Example 1 of the present invention.

The spherical aberration, offence against the sine condition, astigmatism, distortion aberration (distortion), and lateral chromatic aberration (chromatic aberration of magnification) of Example 1 at the wide angle end are illustrated respectively in diagrams A to E of FIG. 7, the spherical aberration, offence against the sine condition, astigmatism, distortion aberration (distortion), and lateral chromatic aberration (chromatic aberration of magnification) of Example 1 in the intermediate focal length state are illustrated respectively in diagrams F to J of FIG. 7, and the spherical aberration, offence against the sine condition, astigmatism, distortion aberration (distortion), and lateral chromatic aberration (chromatic aberration of magnification) of Example 1 at the telephoto end are illustrated respectively in diagrams K to O of FIG. 7. All of the aberration diagrams are those when the zoom lens is focused on an object at infinity.

Each aberration diagram is based on the d-line, but the spherical aberration diagrams also illustrate aberrations with reference to the g-line and the C-line. The lateral chromatic aberration diagrams illustrate aberrations with respect to the g-line and the C-line with the d-line as the reference. In the astigmatism diagrams, the solid line illustrates astigmatism in the sagittal direction while the dotted line illustrates astigmatism in the tangential direction. The "Fno." in the spherical aberration diagrams represents the F-number and "ω" in the other aberration diagrams represents the half angle of view.

Figure 8:
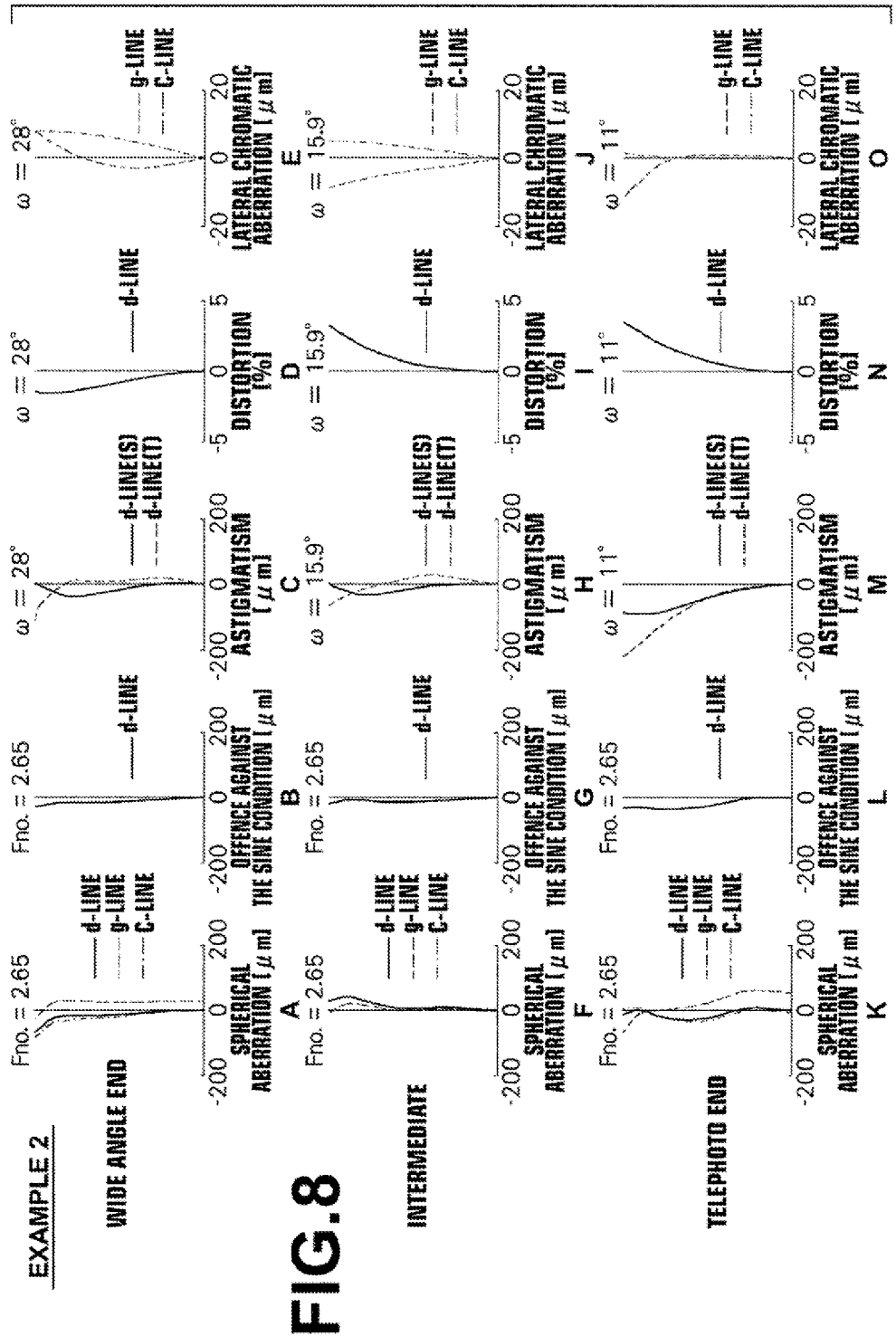
FIG. 8 show aberration diagrams A to O of the zoom lens of Example 2 of the present invention.
Figure 9:
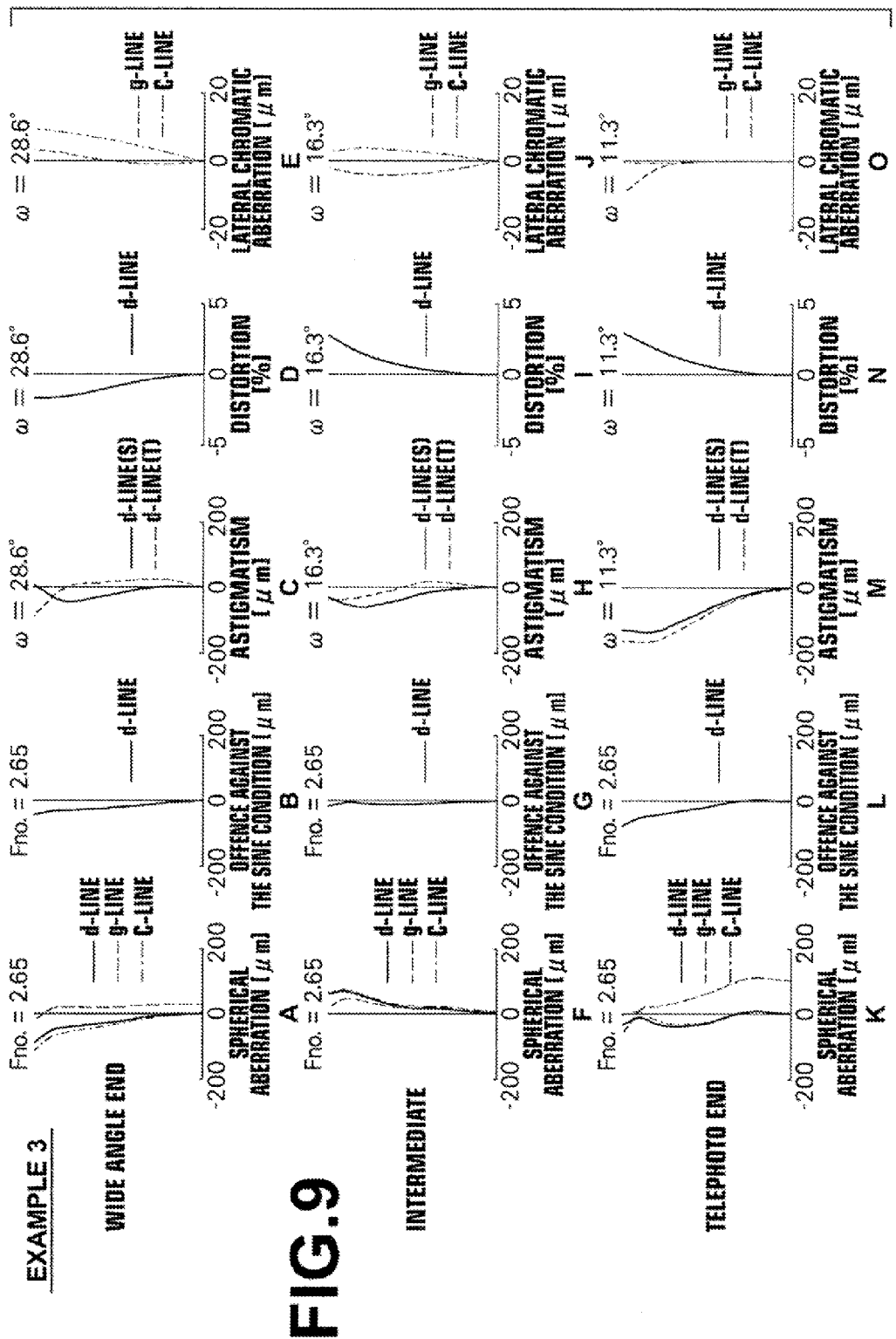
FIG. 9 show aberration diagrams A to O of the zoom lens of Example 3 of the present invention.
Figure 10:
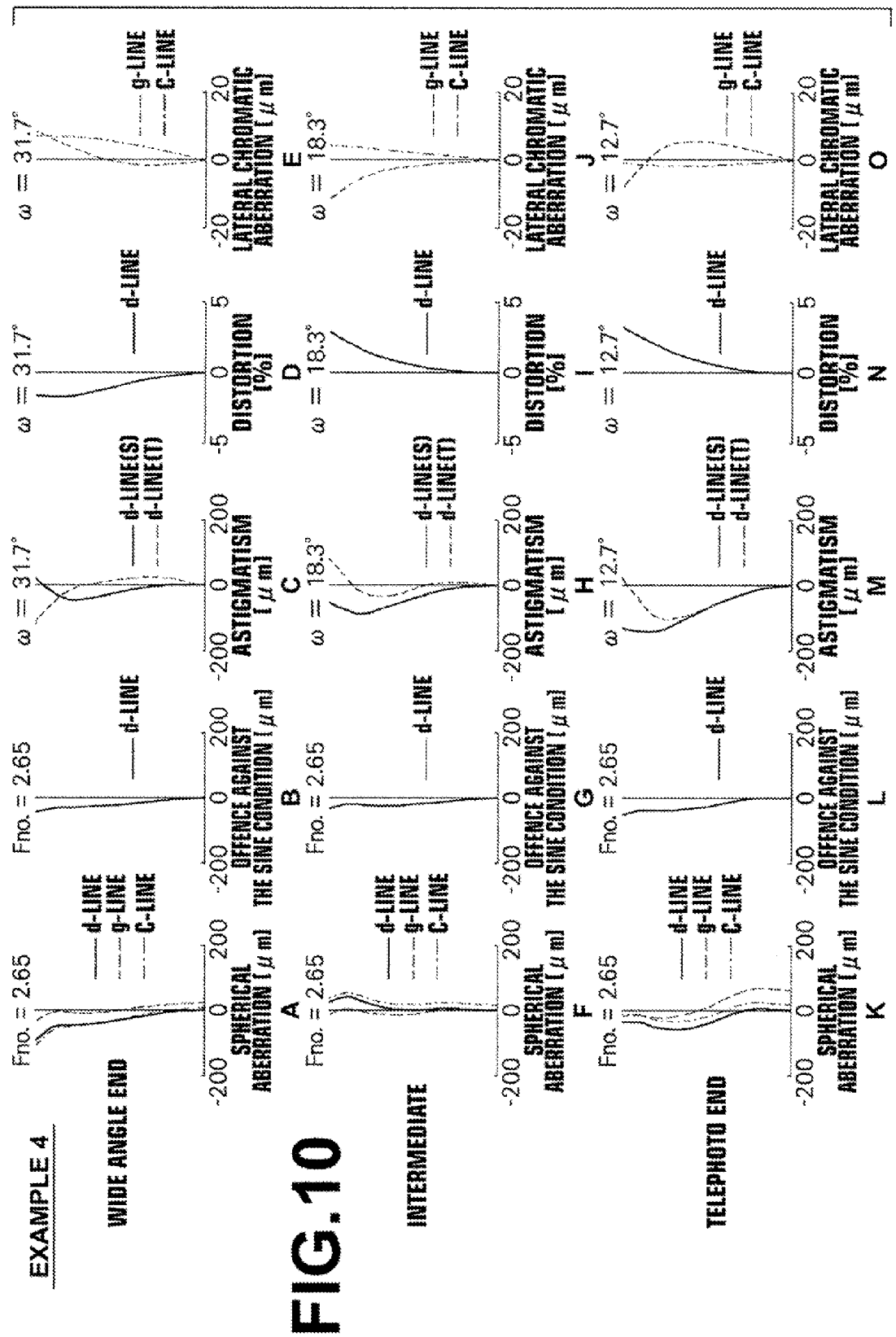
FIG. 10 show aberration diagrams A to O of the zoom lens of Example 4 of the present invention.
Figure 11:
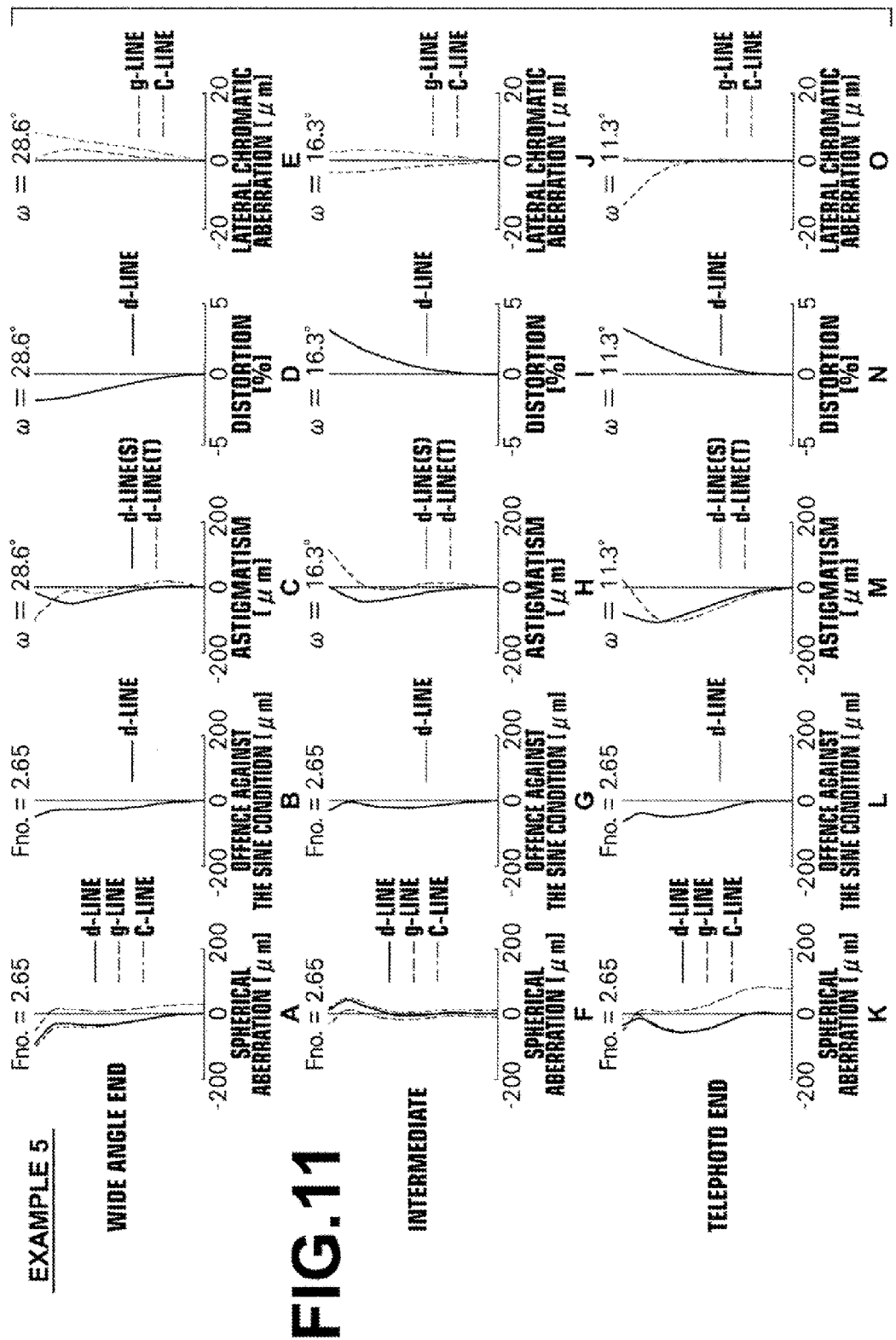
FIG. 11 show aberration diagrams A to O of the zoom lens of Example 5 of the present invention.

Likewise, aberrations of Example 2 at the wide angle end, in the intermediate focal length state, and at the telephoto end are illustrated respectively in the diagrams A to O of FIG. 8. Further, aberrations of Example 3 at the wide angle end, in the intermediate focal length state, and at the telephoto end are illustrated respectively in the diagrams A to O of FIG. 9, aberrations of Example 4 at the wide angle end, in the intermediate focal length state, and at the telephoto end are illustrated respectively in the diagrams A to O of FIG. 10, and aberrations of Example 5 at the wide angle end, in the intermediate focal length state, and at the telephoto end are illustrated respectively in the diagrams A to O of FIG. 11.

Figure 12:
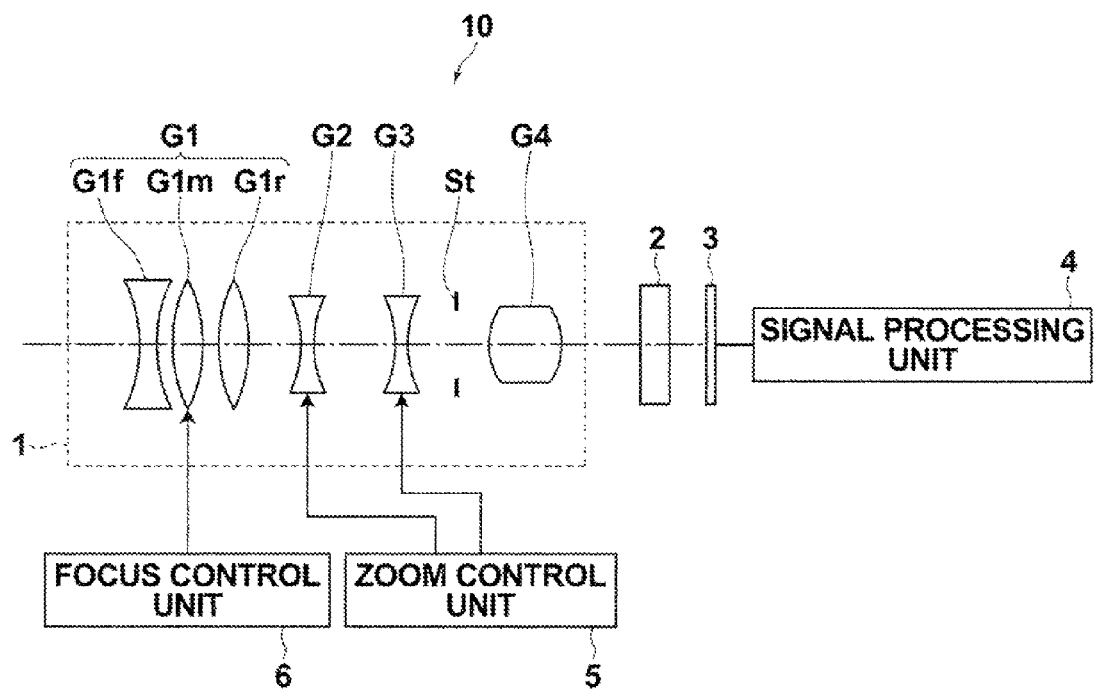
FIG. 12 is a schematic configuration diagram of an imaging apparatus according to an embodiment of the present invention.

Next, an imaging apparatus according to an embodiment of the present invention will be described. As an example of imaging apparatus according to an embodiment of the present invention, a schematic configuration diagram of an imaging apparatus 10 that uses a zoom lens 1 of an embodiment of the present invention is shown in FIG. 12. As for the imaging apparatus, for example, a digital camera, a video camera, or a broadcasting camera may be cited.

The imaging apparatus 10 illustrated in FIG. 12 includes the zoom lens 1, a filter 2 disposed on the image side of the zoom lens 1, an image sensor 3 that captures an image of a subject formed by the zoom lens 1, a signal processing unit 4 that performs an arithmetic operation on the output signal from the image sensor 3, a zoom control unit 5 for zooming the zoom lens 1, and a focus control unit 6 for performing focus control.

As lens groups, the zoom lens has a first lens group G1 having a positive refractive power, a second lens group having a negative refractive power, a third lens group G3 having a negative refractive power, and a fourth lens group G4 having a positive refractive power. The first lens group G1 is composed of three lens groups, composed of a first lens group front group G1f having a negative refractive power, a first lens group middle group G1m having a positive refractive power, and a first lens group rear group G1r having a positive refractive power. Note that each lens group is schematically illustrated in FIG. 12.

Zooming is performed by the zoom control unit 5 by moving the second lens group G2 and the third lens group G3 in an optical axis direction. Focus adjustment is performed by the focus control unit 6 by moving the first lens group middle group G1m in an optical axis direction.

The image sensor 3 outputs an electrical signal by capturing an optical image formed by the zoom lens 1 and is disposed such that the imaging surface thereof corresponds to the image plane. As for the image sensor 3, for example, a CCD, a CMOS, or the like may be used.

Although not shown in FIG. 12, the imaging apparatus 10 may further include a shake correction mechanism that corrects blurring of captured image during vibration or camera shake by moving some of the constituent elements in a direction intersecting the optical axis Z.

So far, the present invention has been described by way of the embodiments and Examples, but the present invention is not limited to the foregoing embodiments and Examples and various modifications may be made. For example, values of the radius of curvature of each lens element, surface distance, refractive index, Abbe number, aspherical surface coefficient, and the like are not limited to those illustrated in each numerical example and may take other values.

What is claimed is:

1. A zoom lens, substantially consisting of four lens groups, composed of a first lens group having a positive refractive power, a second lens group having a negative refractive power, a third lens group having a negative refractive power, and a fourth lens group having a positive refractive power, disposed in order from the object side, wherein:

upon zooming from the wide angle end to the telephoto end, the first lens group and the fourth lens group are fixed in an optical axis direction, the second lens group is moved to the image side, and the third lens group is moved so as to correct an image plane variation due to the movement of the second lens group;

the first lens group is substantially consists of three lens groups, composed of a first lens group front group having a negative refractive power, a first lens group middle group having a positive refractive power, and a first lens group rear group having a positive refractive power, disposed in order from the object side;

the first lens group front group substantially consists of three lenses, composed of two negative lenses and one positive lens, disposed in order from the object side;

the first lens group middle group is composed of a cemented lens in which a negative lens and a positive lens are cemented;

the zoom lens is configured such that focusing is performed by moving only the first lens group middle group in an optical axis direction; and the zoom lens satisfies a conditional expression (2) given below:

$$2.5 < t1/fw < 14.0 \quad (2),$$

where:
t1: the distance from the most object side surface of the first lens group to the most image side surface of the first lens group on the optical axis; and
fw: the focal length of the entire system at the wide angle end.

2. The zoom lens of claim 1, wherein the first lens group rear group is composed of a cemented lens in which a biconcave lens and a biconvex lens are cemented, a biconvex lens, and a positive meniscus lens, disposed in order from the object side.

3. The zoom lens of claim 2, wherein the zoom lens satisfies a conditional expression (1') given below:

$$2.5 < f1/fw < 3.5 \quad (1'),$$

where
f1: the focal length of the first lens group.

4. The zoom lens of claim 2, wherein the zoom lens satisfies a conditional expression (2') given below:

$$2.5 < t1/fw < 4.0 \quad (2').$$

5. The zoom lens of claim 1, wherein the zoom lens satisfies a conditional expression (1') given below:

$$2.5 < f1/fw < 3.5 \quad (1'),$$

where
f1: the focal length of the first lens group.

6. The zoom lens of claim 5, wherein the zoom lens satisfies a conditional expression (2') given below:

$$2.5 < t1/fw < 4.0 \quad (2').$$

7. The zoom lens of claim 1, wherein the zoom lens satisfies a conditional expression (2') given below:

$$2.5 < t1/fw < 4.0 \qquad (2').$$

8. An imaging apparatus, comprising the zoom lens of claim 1.

* * * * *